United States Patent
Dijsselbloem et al.

(10) Patent No.: US 10,538,014 B2
(45) Date of Patent: Jan. 21, 2020

(54) PROCESS FOR PRODUCING A GLASS FIBRE-REINFORCED THERMOPLASTIC POLYMER COMPOSITION

(71) Applicants: SABIC GLOBAL TECHNOLOGIES B.V., Bergen op Zoom (NL); Willy Joseph Dijsselbloem, Overpelt (BE); Stefan Gielen, Genk (BE); Johannes Benedictus Joseph Martens, Limbricht (NL)

(72) Inventors: Willy Joseph Dijsselbloem, Overpelt (BE); Stefan Gielen, Genk (BE); Johannes Benedictus Joseph Martens, Limbricht (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 523 days.

(21) Appl. No.: 15/034,271

(22) PCT Filed: Oct. 7, 2014

(86) PCT No.: PCT/EP2014/071456
§ 371 (c)(1),
(2) Date: May 4, 2016

(87) PCT Pub. No.: WO2015/062826
PCT Pub. Date: May 7, 2015

(65) Prior Publication Data
US 2016/0279831 A1  Sep. 29, 2016

(30) Foreign Application Priority Data

Nov. 4, 2013 (EP) .................................... 13191407

(51) Int. Cl.
*B29B 9/14* (2006.01)
*B29B 15/12* (2006.01)
(Continued)

(52) U.S. Cl.
CPC .............. *B29B 9/14* (2013.01); *B29B 15/122* (2013.01); *B29B 9/06* (2013.01); *B29K 2023/12* (2013.01); *B29K 2309/08* (2013.01)

(58) Field of Classification Search
CPC ............................. B29B 15/14; B29B 15/122
See application file for complete search history.

(56) References Cited

U.S. PATENT DOCUMENTS 3,119,718 A * 1/1964 Bradt ...................... B29B 9/14
 118/68
3,577,872 A * 5/1971 Drummond .............. D06B 3/04
 57/296

(Continued)

FOREIGN PATENT DOCUMENTS

EP 0994978 B1 10/2004
WO 9501939 A1 1/1995
WO 2009080281 A1 7/2009

OTHER PUBLICATIONS

Uhlmann, D.R. and Kreidl, N.J. eds., 1980. Elasticity and strength in glasses (vol. 5). Academic Pr. (Applicable text of p. 137 provided in office action, PDF copy not provided) (Year: 1980).*

(Continued)

*Primary Examiner* — Leith S Shafi
*Assistant Examiner* — Nicholas R Krasnow
(74) *Attorney, Agent, or Firm* — Cantor Colburn LLP

(57) ABSTRACT

The present application relates to process for producing a glass fibre-reinforced thermoplastic polymer composition, which comprises the sequential steps of:
 a) unwinding from a package of at least one continuous glass multifilament strand,
 b) applying a sheath of thermoplastic polymer around the at least one continuous glass multifilament strand to form a sheathed continuous multifilament strand;
The unwound, the at least one continuous glass multifilament strand is transported through the inside of at least one (Continued)

protective tube over a certain distance between the location of unwinding from a package of said at least one continuous glass multifilament strand, i.e. step a), and the location of applying said sheath of thermoplastic polymer around said at least one continuous glass multifilament strand, i.e. step b).

20 Claims, 1 Drawing Sheet

(51) Int. Cl.
    *B29B 9/06*         (2006.01)
    *B29K 23/00*       (2006.01)
    *B29K 309/08*     (2006.01)

(56) References Cited

U.S. PATENT DOCUMENTS

| | | | | |
|---|---|---|---|---|
| 3,939,639 A * | 2/1976 | Ellegast | ............... | B65H 51/16 |
| | | | | 264/210.8 |
| 4,614,678 A | 9/1986 | Ganga | | |
| 4,875,757 A * | 10/1989 | Greveling | ............ | G02B 6/4401 |
| | | | | 385/113 |
| 5,139,403 A * | 8/1992 | Stuart | ...................... | B29B 9/00 |
| | | | | 425/111 |
| 5,601,775 A * | 2/1997 | Cunningham | ......... | D01D 11/06 |
| | | | | 264/103 |
| 2005/0053768 A1 * | 3/2005 | Friedman | ................ | B32B 3/30 |
| | | | | 428/167 |
| 2010/0313605 A1 * | 12/2010 | Soliman | ................... | B29B 9/14 |
| | | | | 65/442 |

OTHER PUBLICATIONS

International Search Report for International Application No. PCT/EP2014/071456; International Filing Date: Oct. 7, 2014; dated Dec. 11, 2014, 4 Pages.
Written Opinion of the International Searching Authority for International Application No. PCT/EP2014/071456; International Filing Date: Oct. 7, 2014; dated Dec. 11, 2014; 4 Pages.

\* cited by examiner

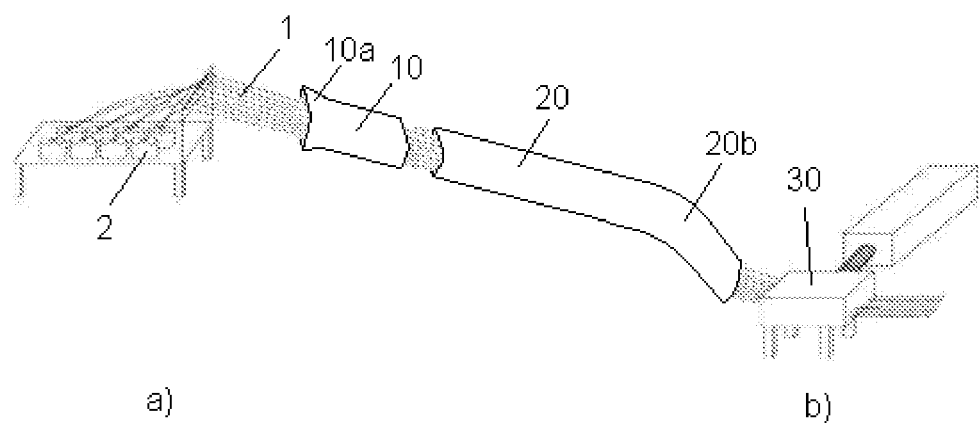
a)                    b)

PROCESS FOR PRODUCING A GLASS FIBRE-REINFORCED THERMOPLASTIC POLYMER COMPOSITION

CROSS REFERENCE TO RELATED APPLICATIONS

This application is a 371 of International Application No. PCT/EP2014/071456, filed Oct. 7, 2014, which claims priority to EP 13191407.9, filed Nov. 4, 2013 which are incorporated herein by reference in their entirety.

The present invention relates to a process for producing a glass fibre-reinforced thermoplastic polymer composition. In such a process two basic steps are sequentially carried out, i.e.

a) unwinding from a package of at least one continuous glass multifilament strand, b) applying a sheath of thermoplastic polymer around the at least one continuous glass multifilament strand to form a sheathed continuous multifilament strand.

Such process is known from International application WO 2009/080281 in the name of the present applicant. This WO document discloses a process for producing a long glass fibre-reinforced thermoplastic polymer composition, which comprises the steps of i) unwinding from a package of at least one continuous glass multifilament strand, ii) applying an impregnating agent to said at least one continuous glass multifilament strand to form an impregnated continuous multifilament strand, and iii) applying a sheath of thermoplastic polymer around the impregnated continuous multifilament strand to form a sheathed continuous multifilament strand.

U.S. Pat. No. 4,614,678 discloses a process for the manufacture of a composite material comprising a flexible sheath covering a roving of fibers impregnated to the core with a finely powdered thermoplastic. In the method a continuous roving of fibers is unwound from a feed and via an air-lock enters a fully sealed fluidization chamber, where finely powdered thermoplastic is maintained in a state of fluidization. Via electrostatic charge the powdered thermoplastic impregnates the roving. The so impregnated roving is then sheathed with a plastic sheath.

Fibre-reinforced plastics are composite materials with a wide range of applications in industry, for example in the aerospace, automotive, shipping, building and construction industries. The term "composite" can apply to any combination of individual materials, for example to a thermoplastic polymer (the matrix) in which fibres (reinforcing filler) have been dispersed. A great diversity of organic fibres, including synthetic fibres such as polyamide, polytetrafluoroethylene, polyesters, natural fibres, such as cotton, hemp, flax, jute; and inorganic fibres, such as glass fibres are often used as reinforcements in composite materials.

A glass multifilament strand as disclosed in WO 2009/080281 is also referred to as a roving.

Long glass fibre-reinforced thermoplastic polymer compositions—optionally in the form of, for example, pellets or granules—are being used in industry because of their excellent mechanical strength. Long glass fibre-reinforced compositions are generally prepared by a sheathing or wire-coating process, by crosshead extrusion or pultrusion techniques. Using these technologies, impregnated or coated fibre strands are formed; these may then be cut into lengths, the pellets or granules thus obtained being suitable for further processing, i.e. for injection moulding and compression moulding as well as for extrusion compression moulding processes, into (semi)-finished articles. Long glass fibre-reinforced polymer compositions contain glass fibres having a length of at least 1 mm, often at least 2 mm and typically between 5 and 20 mm. As a result, glass fibres in moulded articles made from long glass fibre-reinforced polymer compositions generally are of higher length than in articles made from short glass fibre reinforced compositions, resulting in better mechanical properties.

In a pultrusion process, a bundle of continuous glass filaments is spread out into individual filaments and drawn through an impregnation die, into which the molten thermoplastic is injected, aiming at entirely wetting and impregnating each filament with the molten thermoplastic. A strand is drawn from the die and then cooled. Finally the strand is cut into pellets of the desired length. The glass fibres are generally parallel to one another in the pellet, with each fibre being individually surrounded by the thermoplastic. Pultrusion processes typically a are run at relatively low line speeds.

The process of sheathing or wire-coating is done without wetting the fibres individually with thermoplastic, but by forming a continuous outer sheath of a thermoplastic material around the continuous multifilament strand. The sheathed continuous strand is cut into pellets or granules of desired length, e.g. for about 12 mm length, in which the fibres are generally parallel to one another and have the same length as the pellets. Only when such pellets are supplied to an injection moulding or compression moulding machine the glass fibres are dispersed within the thermoplastic polymer so as to form moulded (semi)-finished glass fibre reinforced articles. In order to facilitate the impregnation of the fibres during such moulding processes (meaning an even dispersion of the glass fibres in the polymer matrix), the continuous strand can be treated with a an impregnating agent prior to applying a sheath of thermoplastic polymer. An advantage of the sheathing or wire coating process over pultrusion processes is that the wire-coating or sheathing process (i.e. the process according to WO 2009/080281) is able to run at much higher line speeds. A drawback of the higher line speed however is that it requires the need of a high speed of providing the glass multifilament strands as well. More in particular, the glass multifilament strands need to be unwound from the transport bobbins relatively fast and need be transported through the production facility with the same high line speed. This fast unwinding and/or high transport speed may result in the formation of loose glass fibres and/or entanglements between neighbouring glass multifilament strands, such causing difficulties in handling and unwinding of packages and fouling of equipment and production environment. In addition fluctuations in production stability and reproducibility during the sheathing step may occur, thus resulting in quality variations of the glass fibre-reinforced thermoplastic products and pellets or granules. In worst case entanglements may cause breakage of the glass multifilament strand(s).

The object of the present invention is therefore to provide a process for producing a glass fibre-reinforced thermoplastic polymer composition which overcomes, at least in part, the aforementioned disadvantages.

BRIEF DESCRIPTION OF THE DRAWING

The following is a brief description of the drawing which is presented for the purposes of illustrating the exemplary embodiments disclosed herein and not for the purposes of limiting the same.

The FIGURE is a schematic view of a system as disclosed herein.

This object is achieved according to the invention with a process as defined by the claims. More specifically, the present invention concerns a process for producing a glass fibre reinforced thermoplastic polymer composition, which comprises the sequential steps of:

a) unwinding from a package of at least one continuous glass multifilament strand, b) applying a sheath of thermoplastic polymer around the at least one continuous glass multifilament strand to form a sheathed continuous multifilament strand;

wherein the unwound, the at least one continuous glass multifilament strand is transported through the inside of at least one protective tube over a certain distance between the location of unwinding from a package of said at least one continuous glass multifilament strand, i.e. step a), and the location of applying said sheath of thermoplastic polymer around said at least one continuous glass multifilament strand, i.e. step b).

Surprisingly, by transporting the at least one continuous glass multifilament strand through the inside of at least one protective tube over a certain distance between the location of step a), and the location of step b), the present process allows trouble-free handling and unwinding of packages, no fouling of the equipment used, stable and constant production and good reproducibility during the sheathing step, and results in glass fibre-reinforced thermoplastic products of constant quality. The meaning of the feature "protective tube" does not include the well-known guide eyes, i.e. metal or ceramic rings to guide for example glass strands. However, in the present method such guide eyes may nevertheless be present.

Another advantage is that a higher number of strands can be handled in a limited area/space since protective tubes can cross each other, and this would not be possible with glass strands. Furthermore, the process according to the invention can be operated at high throughput rates, with constant product quality.

The at least one protective tube is preferably made of an abrasion resistant material and having a low friction coefficient. Such a type of material enables high line speeds without the risk of forming scratches on the inside of the protective tube resulting in the formation of fuzz and blocking of the line production. The coefficient of friction (COF), often symbolized by the Greek letter is a dimensionless scalar value which describes the ratio of the force of friction between two bodies and the force pressing them together. The coefficient of friction in the tube-multifilament strand system of the invention (COF) is preferably less than 0.95. A COF higher than 0.95 may result in formation of so-called fuzz balls The at least one protective tube is preferably made of an abrasion resistant material chosen from the group of glass and ceramics, or a combination thereof. The use of plastic protective pipes to guide glass strands does not form a part of the present invention. Such plastic protective pipes are excluded due to non performance, including the formation of scratches and high abrasion on the inside of the protective tube resulting in the creation of fuzz, especially at high line speeds. In addition, a disadvantage of metal protective tubes is that their inner surface gets ingrained so rough which generates fuzz balls. After a while this will result in a possible break of the glass strand which is of course an unwanted situation.

According a special embodiment of the present invention the inside of the at least one protective tube is provided with a low friction coefficient coating, Such a low friction coefficient coating provides a smooth transport of the continuous glass multifilament strand through the inside of the protective tube.

The present inventors found that the at least one protective tube is preferably made of glass, the use of glass tubs resulting in a coefficient of friction (COF) for the glass-multifilament system of less than 0.95, preferably less than 0.90.

With reference to the FIGURE, in a situation in which the continuous glass multifilament strands 1 are to be transported over a long vertical and/or horizontal distance, or over several corners the unwound, the at least one continuous glass multifilament strand 1 is preferably transported through the inside of several protective tubes 10, 20 placed in series before applying said sheath of thermoplastic polymer. Upon applying a construction of several placed in series protective tubes 10, 20 one can bridge any distance between the location of step a) and the location of step b).

In some situations it may be useful to transport the at least one continuous glass multifilament strand 1 in the free environment surrounding said at least one continuous glass multifilament strand 1. This means that at some positions between the several placed in series protective tubes 10, 20 the unwound, the at least one continuous glass multifilament strand 1 will not be surrounded by a protective tube 10, 20. Such a situation is for example possible when bridging vertical distances in the working space, or when dealing with corners.

In the method according to the invention it is preferred however that over at least 60%, such as at least 70% or at least 80% of the total distance the at least one continuous glass multifilament strand is transported between locations of steps a) and b) respectively through one or more protective tubes. In practice the distance will be at most 95% of said total distance.

According to the present invention it is also possible that two or more unwound, continuous glass multifilament strands are transported through the inside of a common protective tube before applying said sheath of thermoplastic polymer. However, the transport of multiple continuous glass multifilament strands (rovings) needs to be carry out very carefully because the strand breakage of one strand can have the effect that the running strand(s) will pull the broken strand leading to a possible process disorder.

According to a preferred embodiment the inner diameter of the protective tube is at least 10 mm, such as at least 15 mm, at least 20 mm, at least 25 mm. The inner diameter of the protective tube is preferably at most 50 mm, such as at most 45 mm, at most 40 mm or at most 35 mm. As such the inner diameter of the tube may be from 10 mm-50 mm, from 15 mm-50 mm, from 20-50 mm, from 25 mm-50 mm or from 20 mm-40 mm. Other combinations of upper and lower limits for the inner diameter are to be regarded as disclosed herein. The minimum inner diameter allows "free movement" of continuous glass multifilament strand in the inside area of the protective tube. If the inner diameter is too low, then there will be more contact between the continuous glass multifilament strand and the inside area of the protective tube resulting in higher risk of damaging of the continuous glass multifilament strand.

The protective tube 10 preferably has an entrance opening that is funnel shaped 10a and having an entrance diameter that is larger than the diameter of the majority of the tube 10. For example the entrance diameter of the tube 10 may be 1.5-3 times the diameter of (the remainder of) the tube 10. A funnel shape 10a allows easy feeding when starting up the line but also further reduces the aforementioned problems.

Similarly, the protective tube 10 preferably has an exit opening that is funnel shaped 10a and having an exit diameter that is larger than the diameter of the majority of the tube 10. For example the exit diameter of the tube 10 may be 1.5-3 times the diameter of (the remainder of) the tube 10.

The present method is preferably carried out when the line speed of unwinding the at least one continuous glass multifilament strand is at least 100 m/min, preferably at least 300 m/min, even more preferably at least 400 m/min.

A present process for producing a glass fibre-reinforced thermoplastic polymer composition further comprises applying an impregnating agent to said at least one continuous glass multifilament strand before applying said sheath of thermoplastic polymer.

In a preferred embodiment the at least one protective tube 20 comprises a curvature shape 20b. This means that the present method is not limited to a straight protective tube 10, but that straight 10 and/or curved 20 protective tubes can be used. However, the risk on creating fuzz when using a protective tube 20 comprising a curvature shape 20b should not be ignored. In that case it is preferred to minimise the length of the curved tubes 20.

In order to prevent the risk of breakage of the protective tube self it is preferred that the at least one protective tube is provided on its outer diameter with a strengthening layer, wherein preferably said strengthening layer is a strengthening tube surrounding the at least one protective tube, said strengthening tube especially comprising polycarbonate. In a preferred embodiment said strengthening layer is a polyethylene shrink foil. In case of an accident, for example a breakage of the protective tube self, the broken pieces of the protective tube will not damage or hurt the surrounding area, for example employees.

In case some glass strands or glass parts detach from the continuous glass multifilament strand it is expedient to remove the debris formed from the inside of the protective tube. Therefore, the at least one protective tube is preferably provided with one or more openings located along the longitudinal length of the protective tube, wherein preferably said one or more openings are provided with suction means. These openings may also function as temperature regulating means. Alternatively such suction means are positions between to tubes when several such tubes are placed in series.

The process according to the present invention may further comprise a step of cutting the sheathed continuous glass multifilament strand into pellets, and may further comprise a step of moulding the glass fibre-reinforced thermoplastic polymer composition into (semi-)finished articles.

The process for producing a glass fibre-reinforced thermoplastic polymer composition comprises a step of a) unwinding from a package 2 at least one continuous glass multifilament strand 1 containing a sizing composition. Glass multifilament strands containing a sizing composition and their preparation are known in the art. The filament density of the continuous glass multifilament strand 1 may vary within wide limits. Preferably, the continuous multifilament strand 1 may have of from 500 to 10000 glass filaments per strand and more preferably from 2000 to 5000 glass filaments per strand, because of high throughput. The diameter of the glass filaments in the continuous multifilament strand 1 may widely vary. Preferably, the diameter of the glass filaments ranges from 5 to 50 microns, more preferably from 10 to 30 microns and most preferably from 15 to 25 microns.

In practice the steps of applying the impregnating agent and applying of the sheath may be performed directly after each other. Between the steps of unwinding and impregnating the glass fibre bundle, additional steps known to a skilled person may optionally be applied, like preheating of the glass fibres or spreading the glass filaments by pulling the strand over guide members or integrity breakers. It is, however, an advantage of the present process that such steps are not necessary to make good quality products at high speed.

The impregnating agent used in the process according to the present invention is at least one compound that is compatible with the thermoplastic polymer to be reinforced, enabling it to enhance dispersion of the fibres in the thermoplastic polymer matrix during the moulding process.

The viscosity of the impregnating agent should be lower than 100 cS, preferably lower than 75 cS and more preferably lower than 25 cS at application temperature. The viscosity of the impregnating agent should be higher than 2.5 cS, preferably higher than 5 cS, and more preferably higher than 7 cS at the application temperature. An impregnating agent having a viscosity higher than 100 cS is difficult to apply to the continuous glass multifilament strand. Low viscosity is needed to facilitate good wetting performance of the fibres, but an impregnating agent having a viscosity lower than 2.5 cS is difficult to handle, e.g., the amount to be applied is difficult to control; and the impregnating agent could become volatile. For example, when the matrix is polypropylene, the application temperature of the impregnating agent can be from 15 to 200° C. The amount of impregnating agent applied to the glass multifilament strand depends on the thermoplastic matrix, on the size (diameter) of the filaments forming the continuous strand, and on type of sizing that is on the surface of the fibres. A certain minimum amount of impregnating agent is needed to assist homogeneous dispersion of glass fibres in the thermoplastic polymer matrix during moulding, but the amount should not be too high, because an excess of the agent may result in decrease of mechanical properties of the moulded articles. It is found that the lower the viscosity, the less impregnating agent can be applied. For instance, in case the thermoplastic matrix is polypropylene homopolymer with a melt index MFI of 25 to 65 g/10 min (ISO 1133, 230° C./2.16 kg) and the reinforcing glass filaments have a diameter of 19 micron, the impregnating agent is preferably applied to the multifilament strand in an amount of from 2 to 10% by mass.

According to the present invention, the impregnating agent should be compatible with the thermoplastic polymer to be reinforced, and may even be soluble in said polymer. The impregnating agent is preferably non-volatile, and substantially solvent-free. Being non-volatile means that the impregnating agent does not evaporate under the application and processing conditions applied; that is it has a boiling point or range higher than said processing temperatures. In the context of present application, "substantially solvent-free" means that impregnating agent contains less than 10% by mass of solvent, preferably less than 5% by mass solvent. Most preferably, the impregnating agent does not contain any organic solvent. The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range.

Any method known in the art may be used for applying the liquid impregnating agent to the continuous glass multifilament strand. Suitable methods for applying the impregnating agent to the continuous multifilament strands include applicators having belts, rollers, and hot melt applicators. The method used should enable application of a constant amount of impregnating agent to the continuous multifilament strand.

Suitable examples of thermoplastic polymers generally used in the sheathing process include polyamides, such as polyamide 6, polyamide 66, or polyamide 46; polyolefins like polypropylenes and polyethylenes; polyesters, such as polyethylene terephthalate, polybutylene terephthalate; polycarbonates; polyphenylene sulphide; polyurethanes; also any type of polymer blends and compounds and any combinations thereon. More particularly, polypropylene, polybutylene terephthalate and polyamide 6 may be used. Preferably, the thermoplastic polymer used in the sheathing process is a crystalline polypropylene, like a propylene homopolymer, a random copolymer, or a so-called heterophasic copolymer of propylene and ethylene and/or another alpha-olefin.

The thermoplastic polymer may further contain one or more of usual additives, like stabilisers, processing aids, impact-modifiers, flame-retardants, acid scavengers, inorganic fillers, colorants, or components that further enhance properties of the reinforced compound, like compounds that enhance interfacial bonding between polymer and glass filaments. An example of the last compounds is a functionalized polyolefin, like a maleated polypropylene, in case the thermoplastic is a polypropylene.

Any method known in the art to apply a sheath of thermoplastic polymer around the continuous multifilament strand 1 may be used in present invention. The sheathing or wire-coating process typically involves the application of a polymer layer on the outer surface of the continuous glass multifilament strand 1 as it passes through the polymer melt in a die 30.

The process of the invention may further comprise a step wherein the sheathed continuous glass multifilament strands are cut or chopped into pellets of desired length, suitable for further processing into (semi)-finished articles. Any suitable method known in the art, such as use of the devices mentioned in document EP0994978, may be used in present invention. The length of the glass fibres in the pellets or granules is typically substantially the same as the pellet or granule length, and may vary from 2 to 50 mm, preferably from 5 to 30 mm, more preferably from 6 to 20 and most preferably from 10 to 15 mm. The amount of glass fibres in the pellets or granules obtained with the process according to the invention may vary typically between 20 and 70 mass %, based on the total mass of the composition, depending on the desired properties and end use.

The process according to present invention may comprise a further step of moulding the obtained long glass fibre-reinforced thermoplastic polymer composition in pellet form into (semi-)finished articles. Suitable examples of moulding processes include injection moulding, compression moulding, extrusion and extrusion compression moulding. Injection moulding is widely used to produce articles such as automotive exterior parts like bumpers, automotive interior parts like instrument panels, or automotive parts under the bonnet. Extrusion is widely used to produce articles such rods, sheets and pipes. The invention also relates to moulded articles, made from the glass fibre reinforced thermoplastic polymer composition as obtained with the process according to the invention.

The invention will be further elucidated with reference to the following non-limiting experiments.

Several long glass fibre-reinforced polypropylene compositions, comprising 30 mass % of glass fibres and different amounts of impregnating agent (LOI) were produced by using SABIC® PP579S propylene homopolymer with a MFI of 45 g/10 min (ISO 1133, 230° C./2.16 kg) as polymer matrix. The polymer matrix further comprised 1 mass % of a 40 mass % Carbon black masterbatch, 1 mass % of a functionalized polypropylene, and stabilisers. The glass fibres used were standard Type 30 roving SE4121 3000 Tex, supplied by Owens Corning as a roving package, have filament diameter of 19 microns and contain aminosilane-containing sizing composition applied as aqueous dispersion. A blend of 30 mass % Vybar 260 (hyper-branched polymer, supplied by Baker Petro lite) and 70 mass % Paralux oil (paraffin, supplied by Chevron) was used as impregnating agent. The continuous glass multifilament strands were unwound from the package and transported through the inside of protective tubes to the impregnating agent applicator. The impregnating agent was molten and mixed at a temperature of 160° C. and applied to the continuous glass multifilament strands after unwinding from the package by using an applicator. The sheathing step was performed in-line directly after the impregnating step, using a 75 mm twin screw extruder (manufactured by Berstorff, screw UD ratio of 34), at a temperature of about 250° C., which fed the molten polypropylene matrix material to an extruder-head wire-coating die as known in the art. The line speed for impregnating and sheathing was 400 m/min. The sheathed strand was cut into pellets of 12 mm length. The results are given in the Table. The total length of the protective tubing was 15 m.

TABLE

Effect of protective tube on sheathing process

| Type of protective tube | result |
| --- | --- |
| Polycarbonate Inner diameter 12 mm straight tube) | fuzz of glass on the inner side Increase of roughness of inner side |
| Glass (partially containing a bend) Inner diameter 12 mm | no fuzz of glass, some sticky sizing near the bend |
| Glass (partially containing a bend and having some openings along the length) Inner diameter 12 mm | no fuzz, easy removal of sizing, easy removal of dust |

From the Table one can conclude that, when using a protective tube made of glass, production ran smoothly and stable during at least 8 hours; little fuzz of glass or fouling of glass guiding members was observed. In these runs line speed could be increased to over 400 m/min without any problems.

The invention claimed is:

1. A process for producing a glass fibre-reinforced thermoplastic polymer composition, which comprises the sequential steps of:
   a) unwinding from a package of a continuous glass multifilament strand at a line speed,
   b) applying a sheath of thermoplastic polymer around the continuous glass multifilament strand by passing the continuous glass multifilament strand through a polymer melt in a die to form a sheathed continuous multifilament strand;
   wherein the unwound, continuous glass multifilament strand is transported through the inside of a protective tube having an entrance opening that is funnel shaped over a certain distance between the location of unwinding from a package of said continuous glass multifilament strand in step a), and the location of applying said sheath of thermoplastic polymer around said continuous glass multifilament strand in step b), and wherein the line speed is at least 100 m/min, and wherein the certain distance is at least 60% of the total distance between locations of steps a) and b) respectively.

2. The process according to claim 1, wherein the protective tube is made of a ceramic.

3. The process according to claim 1, wherein the inside of the protective tube is provided with a coating and a coefficient of friction between the inside of the protective tube and the continuous glass multifilament strand is less than 0.95.

4. The process according to claim 1, wherein the protective tube is made of glass.

5. The process according to claim 1, wherein the unwound, continuous glass multifilament strand is transported through the inside of several placed in series protective tubes before applying said sheath of thermoplastic polymer.

6. The process according to claim 5, wherein at some positions between the several placed in series protective tubes the unwound, continuous glass multifilament strand is transported in the free environment.

7. The process according to claim 1, wherein at least two unwound, continuous glass multifilament strands are transported through the inside of a common protective tube before applying said sheath of thermoplastic polymer.

8. The process according to claim 1, wherein the inner diameter of said protective tube is in a range of from 10 mm to 50 mm.

9. The process according to claim 1, wherein the line speed of unwinding the continuous glass multifilament strand is at least 400 m/min.

10. The process according to claim 1, further comprising applying an impregnating agent to said continuous glass multifilament strand before applying said sheath of thermoplastic polymer.

11. The process according to claim 1, wherein the protective tube comprises a curvature shape.

12. The process according to claim 1, wherein the protective tube is provided on its outer diameter with a strengthening layer.

13. The process according to claim 1,
wherein the inside of the protective tube is provided with a coating and a coefficient of friction between the inside of the protective tube and the continuous glass multifilament strand is less than 0.95; and
wherein the protective tube is made of glass.

14. The process according to claim 1,
wherein at least two unwound, continuous glass multifilament strands are transported through the inside of a common protective tube before applying said sheath of thermoplastic polymer;
wherein the inner diameter of said protective tube is in a range of from 10 mm to 50 mm; and
wherein the line speed of unwinding the continuous glass multifilament strand is at least 400 m/min.

15. The process according to claim 12, wherein said strengthening layer is polyethylene shrink foil.

16. The process according to claim 1, wherein a coefficient of friction between the protective tube and the continuous glass multifilament strand is less than 0.95.

17. A process for producing an article, which comprises the sequential steps of:
    a) unwinding from a package of a continuous glass multifilament strand at a line speed;
    b) applying an impregnating agent to said continuous glass multifilament strand;
    c) after applying an impregnating agent to said continuous glass multifilament strand, applying a sheath of thermoplastic polymer around the continuous glass multifilament strand by passing the continuous glass multifilament strand through a polymer melt in a die to form a sheathed continuous multifilament strand;
    d) cutting the sheathed continuous glass multifilament strand into pellets; and
    e) moulding the glass fibre-reinforced thermoplastic polymer composition into the article,
    wherein the unwound, continuous glass multifilament strand is transported through the inside of a protective tube having an entrance opening that is funnel shaped over a certain distance between the location of unwinding from a package of said continuous glass multifilament strand in step a), and the location of applying said sheath of thermoplastic polymer around said continuous glass multifilament strand in step c), and wherein the line speed is at least 100 m/min, and
    wherein the sheath of thermoplastic polymer is around a plurality of glass multifilament strands, and
    wherein the certain distance is at least 60% of the total distance between locations of steps a) and b) respectively.

18. A process for producing a glass fibre-reinforced thermoplastic polymer composition, which comprises the sequential steps of:
    a) unwinding from a package of a continuous glass multifilament strand at a line speed,
    b) applying a sheath of thermoplastic polymer around the continuous glass multifilament strand to form a sheathed continuous multifilament strand;
    wherein the unwound, continuous glass multifilament strand is transported through the inside of a protective tube over a certain distance between the location of unwinding from a package of said continuous glass multifilament strand in step a), and the location of applying said sheath of thermoplastic polymer around said continuous glass multifilament strand in step b), and wherein the line speed is at least 100 m/min, and
    wherein the certain distance is at least 60% of the total distance between locations of steps a) and b) respectively.

19. The process according to claim 18, wherein applying a sheath of thermoplastic polymer around the continuous glass multifilament strand form a sheathed continuous multifilament strand comprises passing the continuous glass multifilament strand through a polymer melt in a die.

20. The process according to claim 18, wherein the protective tube has an entrance opening that is funnel shaped.

* * * * *